March 26, 1968  R. A. OWENS  3,374,728
EGG COOKING DEVICE
Filed March 24, 1965
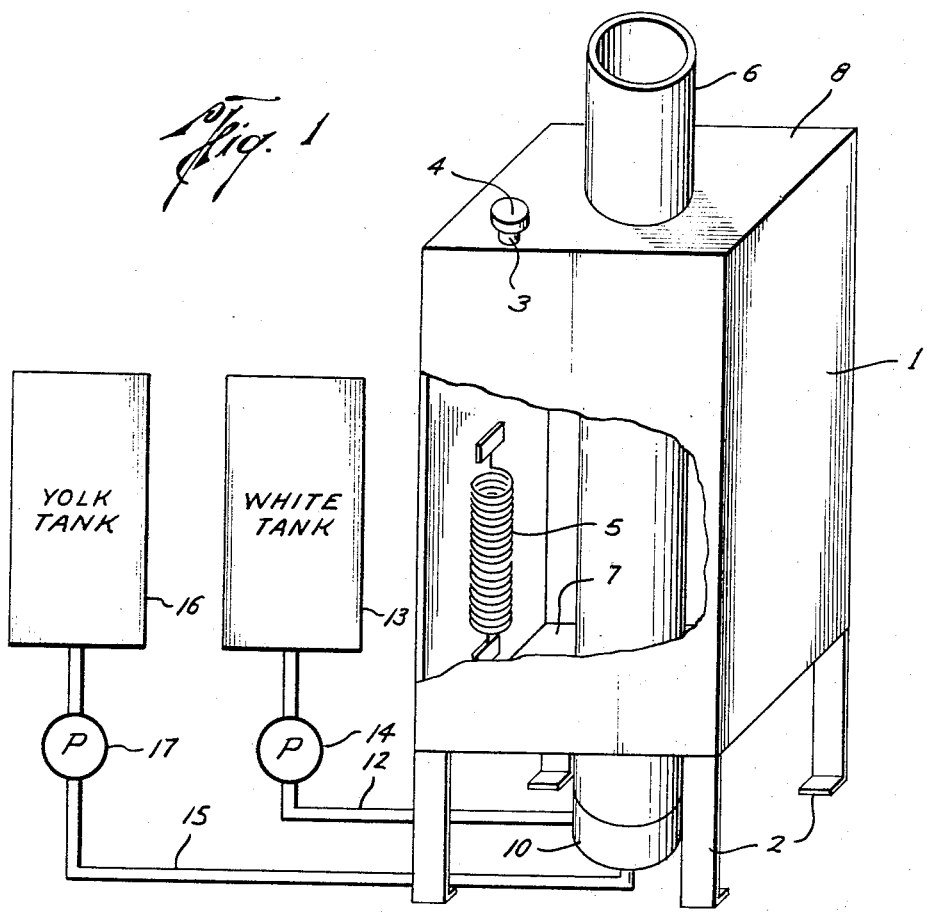
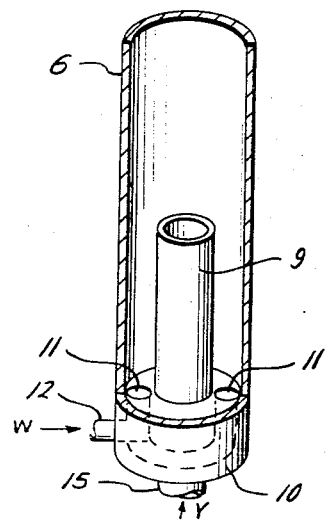
Roy A. Owens
INVENTOR.
BY Pamela O. Wyatt
ATTORNEY

United States Patent Office 3,374,728
Patented Mar. 26, 1968

3,374,728
EGG COOKING DEVICE
Roy A. Owens, 1002 Bissonnet, Houston, Tex. 77005
Filed Mar. 24, 1965, Ser. No. 442,449
4 Claims. (Cl. 99—353)

ABSTRACT OF THE DISCLOSURE

Apparatus for producing an egg product comprising means for propelling egg whites and egg yolks in a continuous stream through a cooking tube with the yolk in concentric relation with the whites.

---

This invention relates to new and useful improvements in an egg cooking device.

It is an object of this invention to provide a device for cooking eggs and for the production of a novel article of manufacture.

In egg production, many eggs that are in every way fully edible and in every way suitable for consumption, are not marketable because of shell imperfection, such as soft shells, cracked shells, undersize eggs or over-sized eggs, and such are usually a loss to the producer. Further, at times, the market for eggs is so depressed that the producer cannot profitably market his eggs in the usual manner, either on a wholesale or retail basis, and is not in position to store them indefinitely. It is an object of this invention to provide a device for preparing cooked eggs for the market to provide an outlet for the otherwise unmarketable eggs.

With the above and other objects in view, the invention has relation to certain novel features of construction, operation and arrangement of parts more particularly defined in the following specifications and illustrated in the accompanying drawings, wherein:

FIGURE 1 is a front elevational view of the device, with the wall of the cooker housing partially broken away, and FIGURE 2 is an enlarged cross sectional view of the cooking tube, illustrating the means for separation of whites and yolks during the initial steps of the cooking to form the desired end product.

Referring now more particularly to the drawings, the numeral 1 designates a cooking housing having suitable supporting members 2, 2. The housing 1 is designed to hold the desired amount of water for cooking the eggs, and is provided with a water inlet 3 having a removable cap 4. A suitable heating element as 5 is mounted in the housing 1 to heat the water for cooking the eggs. The cooking tube 6 extends through the floor 7 of the housing 1 and through the top 8 thereof, and the yolk tube 9 extends through the bottom plug 10 of the tube 6, upwardly into the tube 6.

Passageways 11, 11 extend through the bottom plug 10 and lead into the inside area of the tube 6. Suitable conduits 12, 12 lead from these passageways to the tank 13 containing the whites of the eggs to be cooked and flow is maintained through a suitable pump as 14.

The yolk tube 9 has the conduit 15 extending therefrom to the yolk tank 16 and flow is maintained by a suitable pump as 17.

In operation, the water is heated in the housing 1 until cooking temperatures are attained and the flow from the yolk tank 16 is commenced by activating the pump 17 until the yolk tube 9 is filled. Flow from the white tank is then commenced by activating the pump 14 until the level of the egg white in the tube 6 is high enough to cover the yolk tube 9 with a layer of whites, usually a quarter of an inch above the top of the yolk tube, and when sufficient time has passed to cook the egg white and yolk in the tubes 6 and 9 to a firm consistency, the yolk pump 17 and the white pump 14 are again activated, and are adjusted to pump a continuous flow of white and yolk at a speed that will maintain the firm consistency of the respective parts of the egg as it moves upwardly through the cooking tube 6. As the cooked egg emerges from the top of the tube 6, it may be packaged in suitable containers of any desired length (not shown) and is ready for marketing and consumption.

The novel article of manufacture resulting from this process may be handled and stored as any other prepared food, requiring minimum refrigeration and will remain in edible state for ten days or longer.

It is contemplated that the yolks may be placed in the tank 16 in their natural state or may be treated to produce deviled eggs, by the addition of the desired additional ingredients, so that the end product may be either boiled egg or deviled egg.

The cooker is shown with a single cooking tube, however, it is contemplated that multiple tubes may be employed, functioning in exactly the same manner as hereinabove described, supplied from the single white tank and single yolk tank, or from multiple tanks, with such metering control as may be desired.

While the foregoing is considered a preferred form of the invention, it is by way of illustration only, the broad principle of the invention being defined by the appended claims.

What I claim is:

1. In an egg cooking device, a water reservoir, a heating element in said reservoir, a tubular conduit extending through said reservoir, means for propelling liquid egg whites and yolks through said conduit, at a controlled speed, and means for maintaining the yolks centered within a layer of whites as the liquid solidifies during said movement through said conduit.

2. In an egg cooking device, a water tank, means for heating water in said tank, a tubular conduit extending longitudinally through said tank, means for propelling egg whites and yolks separately into and through said conduit and maintaining said yolks in concentric relation with the whites during the cooking process.

3. In an egg cooking device, a water reservoir having a heating unit therein, an outer tubular conduit extending upwardly through said reservoir, an inner tubular conduit of lesser diameter than the outer conduit concentrically mounted in said first mentioned conduit, positioned therein to provide an annular passageway between said conduits, said inner conduit extending upwardly through the bottom of said outer conduit and terminating a spaced distance from said bottom.

4. In an egg cooking device, a water reservoir, a heating element in said reservoir, an outer tubular conduit extending upwardly through said reservoir, an inner tubular conduit of lesser diameter than the outer conduit concentrically mounted in said first mentioned conduit and extending upwardly through the bottom thereof providing an annular passageway between said conduits and said inner conduit terminating a spaced distance from said bottom and means for propelling egg whites into said outer conduit and simultaneously propelling egg yolk into said inner conduit and propelling the said whites and yolk with the yolk in concentric relation, through and out of said conduits.

References Cited

UNITED STATES PATENTS

| | | | |
|---|---|---|---|
| 1,281,592 | 10/1918 | Laskey | 107—1.4 X |
| 2,009,238 | 7/1935 | Parsons | 99—243 X |
| 2,036,681 | 4/1936 | Campbell | 99—238 X |
| 2,042,940 | 6/1936 | Herron | 107—1.4 |
| 2,208,651 | 7/1940 | Wallace | 99—353 |
| 2,568,491 | 9/1951 | Edwards | 107—1.4 |
| 3,264,974 | 8/1966 | Miller et al. | 99—243 |
| 3,285,749 | 11/1966 | Shires | 99—113 |

WALTER A. SCHEEL, *Primary Examiner.*

A. O. HENDERSON, *Assistant Examiner.*